United States Patent
Kojima et al.

(10) Patent No.: US 7,974,468 B2
(45) Date of Patent: Jul. 5, 2011

(54) IMAGE PROCESSING APPARATUS AND IMAGE PROCESSING METHOD

(75) Inventors: Takayoshi Kojima, Nagano (JP); Taisuke Okawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1233 days.

(21) Appl. No.: 11/588,919

(22) Filed: Oct. 26, 2006

(65) Prior Publication Data

US 2007/0098261 A1    May 3, 2007

(30) Foreign Application Priority Data

Oct. 27, 2005 (JP) ................. 2005-313056

(51) Int. Cl.
G06K 9/00 (2006.01)
(52) U.S. Cl. .............. 382/167; 348/223; 382/274
(58) Field of Classification Search ........... 382/274, 382/276, 284
See application file for complete search history.

(56) References Cited

U.S. PATENT DOCUMENTS

| | | | |
|---|---|---|---|
| 7,253,836 B1 * | 8/2007 | Suzuki et al. | 348/234 |
| 7,417,671 B2 * | 8/2008 | Sugimori | 348/223.1 |
| 2003/0086004 A1 | 5/2003 | Usami | |
| 2004/0201728 A1 | 10/2004 | Tamaru | |
| 2005/0174449 A1 | 8/2005 | Matsuzaka | |
| 2007/0047019 A1 * | 3/2007 | Toyoda | 358/448 |

FOREIGN PATENT DOCUMENTS

| | | |
|---|---|---|
| JP | 2004-282133 | 10/2004 |
| JP | 2005-033255 | 2/2005 |
| JP | 2005-175978 | 6/2005 |

OTHER PUBLICATIONS

European Search Report for the corresponding international application No. 06255549.5-2202 dated Mar. 26, 2008.
European Search Report for corresponding European Patent Application No. 11153984.7-2202 dated Apr. 18, 2011.

* cited by examiner

*Primary Examiner* — Samir A Ahmed
*Assistant Examiner* — Ruiping Li
(74) *Attorney, Agent, or Firm* — Nutter McClennen & Fish LLP; John J. Penny, Jr.; Michael P. Visconti, III (57) ABSTRACT

An image processing apparatus for performing a white balance correction for RAW data obtained by an image capturing unit, includes a storage, operable to store a RAW file to which the RAW data and developed data obtained by performing a development processing to the RAW data are attached, and a corrector, operable to perform the white balance correction for the RAW data based on the developed data stored in the storage.

8 Claims, 8 Drawing Sheets

IMAGE PROCESSING APPARATUS AND IMAGE PROCESSING METHOD

BACKGROUND

1. Technical Field

The present invention relates to an image processing apparatus, an image processing method and a computer-readable recording medium for causing a computer to execute the image processing method.

2. Related Art

There are related digital cameras in various modes. In recent years, a digital camera having the function of storing RAW data which is photographed by an image capturing unit such as a CCD before a development processing, has been developed and put on the market. Such a function is loaded in order to respond to a user's demand that he (she) wants to develop an image photographed by himself (herself) over a personal computer as he (she) likes. The RAW data are stored in a RAW file together with header information including various information and reduced image data (for example, thumbnail data or screen nail data) created by thinning from each RAW data by a predetermined pixel. In the case in which the user reads the RAW data in the RAW file to perform a retouch over the personal computer for the first time, software installed in the personal computer displays an image based on the RAW data on a display. In order to display the image based on the RAW data, a so-called white balance correction is performed to display the image in some cases. At this time, all of color information about each pixel are read from the RAW data, and pixels to easily influence a distortion of an average color of an image to a specific color (for example, a flesh color, a green color of trees and plants or a color of a blue sky) are excluded to average the color information about the residual pixels, thereby calculating a color coefficient of a white balance correction according to JP-A-2004-282133.

However, the RAW data generally have a larger data volume than developed data. For this reason, there is a problem in that a time required for a processing is increased if all of color information about each pixel are read from the RAW data to perform a white balance correction.

SUMMARY

It is an advantage of some aspects of the invention to provide an image processing apparatus and an image processing method which can rapidly perform a white balance correction for RAW data.

According to a first aspect of the invention, there is provided an image processing apparatus for performing a white balance correction for RAW data obtained by an image capturing unit, comprising:

a storage, operable to store a RAW file to which the RAW data and developed data obtained by performing a development processing to the RAW data are attached; and a corrector, operable to perform the white balance correction for the RAW data based on the developed data stored in the storage.

With this configuration, the white balance correction for the RAW data is performed based on the developed data attached to the RAW file. The developed data generally have a smaller data volume than the RAW data. By performing the white balance correction for the RAW data with the developed data set to be an index, therefore, it is possible to perform the correction processing more rapidly as compared with the case in which all of the color information about each pixel are read from the RAW data to perform the white balance correction. The white balance correction may be performed before or after the execution of a pixel interpolation processing for the RAW data.

The corrector may specify a position of a pixel having an achromatic color in the developed data and perform the white balance correction for the RAW data based on color information about a pixel, corresponding to the position of the pixel having the achromatic color in the developed data, in the RAW data.

The pixel having the achromatic color can be easily extracted from the developed data. By performing the white balance correction for the RAW data with the position of the pixel having the achromatic color set to be an index, therefore, it is possible to rapidly perform the correction processing.

The corrector may set respective gains of R, G and B in such a manner that respective values of R, G and B that are the color information have the same level in order to perform the white balance correction for the RAW data.

The corrector may set, as the pixel having the achromatic color, a pixel in which differences between respective values of R, G and B that are color information in the developed data are included in a predetermined range in order to specify the position of the pixel having the achromatic color in the developed data.

The corrector may set, as the pixel having the achromatic color, a pixel in which a ratio of respective values of R, G and B that are color information in the developed data is included in a vicinal range of a value of 1 in order to specify the position of the pixel having the achromatic color in the developed data.

It can be supposed that the pixel having the achromatic color of the developed data has the values of R, G and B which are almost equal to each other. By setting, as the pixel having the achromatic color, the pixel in which the differences between the respective values of R, G and B in the developed data are included in the predetermined range or the pixel in which the ratio of the respective values of R, G and B is included in a vicinal range of a value of 1, it is possible to specify the position of the pixel having the achromatic color with high precision.

The corrector may perform a correction processing to a relationship between a gradation level and an appearance frequency in the RAW data in such a manner that a shape of a histogram representing the relationship between the gradation level and the appearance frequency in the RAW data is coincident with that of a histogram representing a relationship between a gradation level and an appearance frequency in the developed data, thereby performing the white balance correction for the RAW data for each color information.

In this case, by simply adapting the shape of the histogram of the RAW data to that of the histogram of the developed data, therefore, the white balance correction for the developed data is applied to the RAW data. Thus, it is possible to rapidly perform the white balance correction for the RAW data.

The corrector may perform the correction processing in such a manner that a maximum value of the gradation level in which a pixel is present in the histogram in the RAW data is coincident with that of the gradation level in which a pixel is present in the histogram in the developed data for each color information.

The corrector may perform the correction processing in such a manner that a mean value of the gradation level in which a pixel is present in the histogram in the RAW data is coincident with that of the gradation level in which a pixel is present in the histogram in the developed data for each color information.

The corrector may perform the correction processing in such a manner that a gradation level obtained when an accumulation frequency of the histogram in the RAW data has a predetermined number is coincident with that obtained when an accumulation frequency of the histogram in the developed data has a predetermined number for each color information.

In these cases, the correction for causing the shape of the histogram of the RAW data to be coincident with that of the histogram of the developed data can be performed comparatively easily.

The corrector may perform a plurality of the correction processing and select one of the plurality of the correction processing by which a shape of the histogram of the RAW data which approximates to that of the histogram of the developed data most greatly is obtained.

In this case, it is possible to apply the white balance correction for the developed data to the RAW data more properly. In order to select the shape of the histogram of the RAW data obtained after the execution of the correction processing which approximates to that of the histogram of the developed data most greatly, for example, it is also possible to select a shape in which a sum of absolute values of differences between frequencies in the respective gradation levels of both of the histograms is a minimum.

The developed data may be thumbnail data or screen nail data.

The thumbnail data and the screen nail data are often created when storing the RAW data in a photographing device (for example, a digital camera) and are stored together with the RAW data. Therefore, it is preferable that these data should be used practically as the developed data.

According to a second aspect of the invention, there is provided an image processing method of performing a white balance correction for RAW data obtained by an image capturing unit, comprising:

performing the white balance correction for the RAW data based on developed data stored in a storage together with the RAW data and obtained by performing a development processing to the RAW data.

With this configuration, the white balance correction for the RAW data is performed based on the developed data attached to a RAW file. The developed data generally have a smaller data volume than the RAW data. By performing the white balance correction for the RAW data with the developed data set to be an index, therefore, it is possible to perform the correction processing more rapidly as compared with the case in which all of the color information about each pixel are read from the RAW data to perform the white balance correction. The white balance correction may be performed before or after the execution of a pixel interpolation processing for the RAW data.

In the process of performing the white balance correction for the RAW data, a position of a pixel having an achromatic color in the developed data may be specified, and the white balance correction for the RAW data may be performed based on color information about a pixel, corresponding to the position of the pixel having the achromatic color in the developed data, in the RAW data.

The pixel having the achromatic color can be easily extracted from the developed data. By performing the white balance correction for the RAW data with the position of the pixel having the achromatic color set to be an index, therefore, it is possible to rapidly perform the correction processing.

In the process of performing the white balance correction for the RAW data, a relationship between a gradation level and an appearance frequency in the RAW data may be corrected in such a manner that a shape of a histogram representing the relationship between the gradation level and the appearance frequency in the RAW data is coincident with that of a histogram representing a relationship between a gradation level and an appearance frequency in the developed data, thereby performing the white balance correction for the RAW data for each color information in order to perform the white balance correction for the RAW data based on the developed data.

It can be supposed that the developed data are subjected to the white balance correction for the RAW data by any processing method. By simply adapting the shape of the histogram of the RAW data to that of the histogram of the developed data, therefore, the white balance correction for the developed data is applied to the RAW data. Thus, it is possible to rapidly perform the white balance correction for the RAW data.

According to a third aspect of the invention, there is provided a program product comprising a program for causing a computer to execute the image processing method.

The program may be recorded in a computer readable recording medium (for example, a hard disk, an ROM, an FD, a CD or a DVD) or may be distributed from a certain computer to another computer through a transmitting medium (a communication network such as internet or LAN), and furthermore, may be transferred in any other form. By causing one computer to execute the program or a plurality of computers to share respective steps of the program, the image processing method is executed. Therefore, it is possible to obtain the same advantages as those in the image processing method.

DESCRIPTION OF EXEMPLARY EMBODIMENTS

First Embodiment

Figure 1:
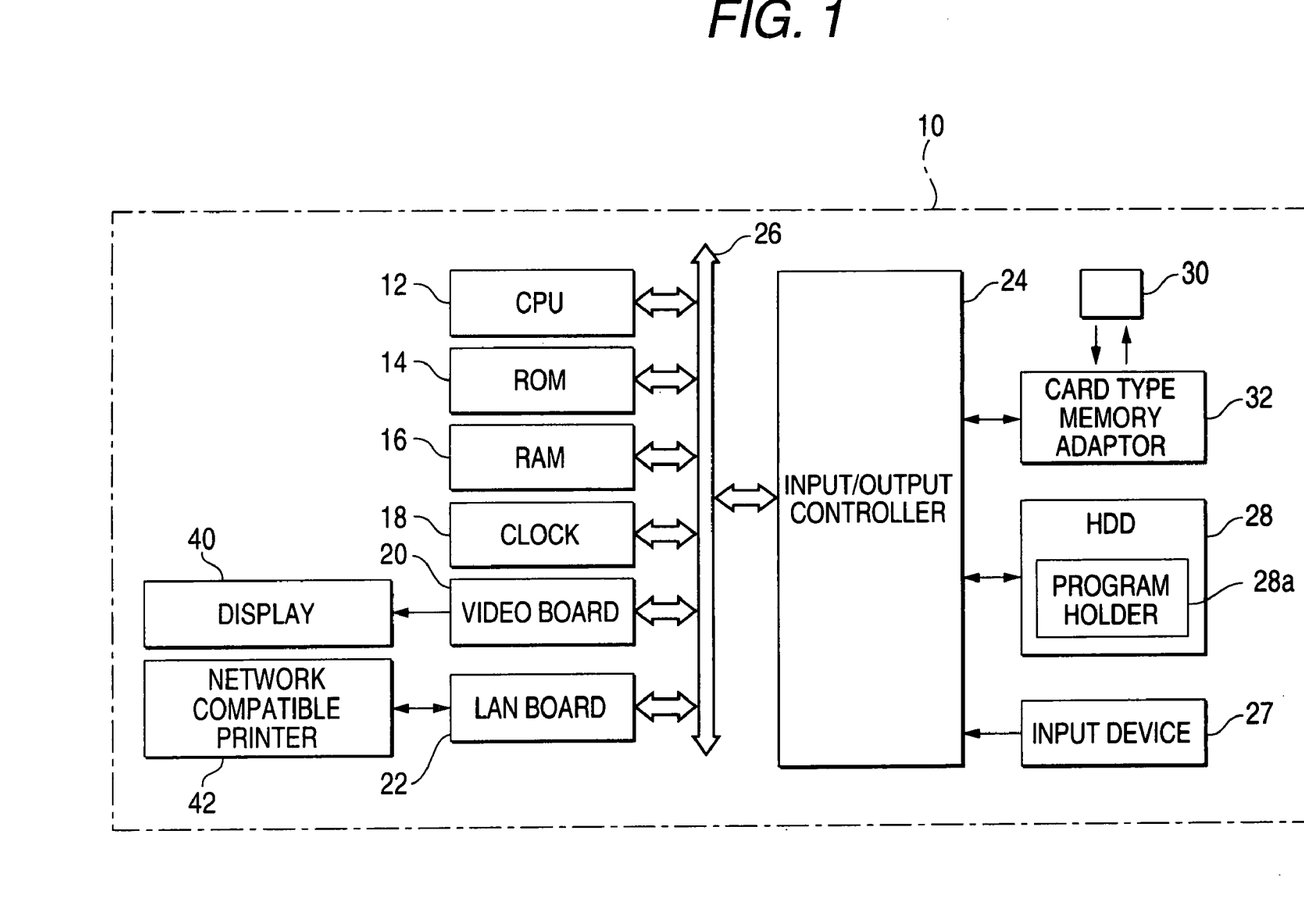
FIG. 1 is a diagram showing a schematic structure of an image processing apparatus.
Figure 2:
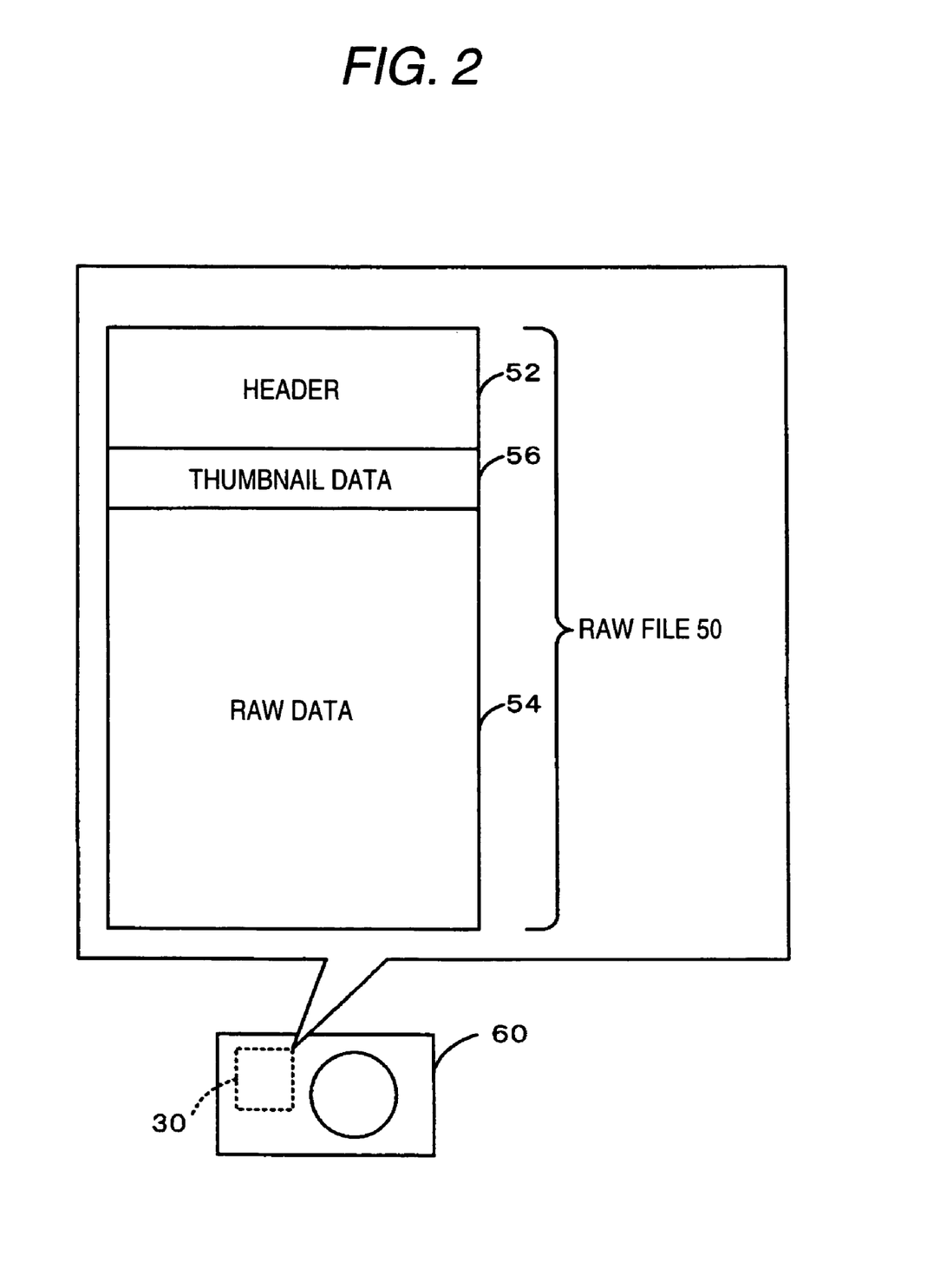
FIG. 2 is an explanatory diagram showing a RAW file.

An embodiment of the invention will be described with reference to the drawings. FIG. 1 is a diagram showing a schematic structure of an image processing apparatus 10 according to a first embodiment, and FIG. 2 is an explanatory diagram showing a RAW file.

In the image processing apparatus 10, a CPU 12 for executing various calculating processings, an ROM 14 for recording a program group to set hardware, an RAM 16 for temporarily recording data when the CPU 12 executes various calculation processings, a clock generator 18 for generating an operation clock, a video board 20 including a display connector to which a display 40 is connected and an LAN board 22 to which a network compatible printer 42 is connected through an LAN cable are connected to an input/output controller 24 for performing a connection to various apparatuses and a control through a bus 26. An input device 27 such as a keyboard or a mouse and a hard disk 28 having a large capacity are connected to the input/output controller 24, and furthermore, a card type memory adaptor 32 capable of transferring data together with a card type memory 30 storing a RAW file 50 (see FIG. 2) for an image photographed by means of a digital camera is connected thereto through a USB terminal. The hard disk 28 includes a program holder 28a for storing various programs such as a JPEG file creating program for performing various corrections for RAW data included in the RAW file and creating a JPEG file.

Figure 3:
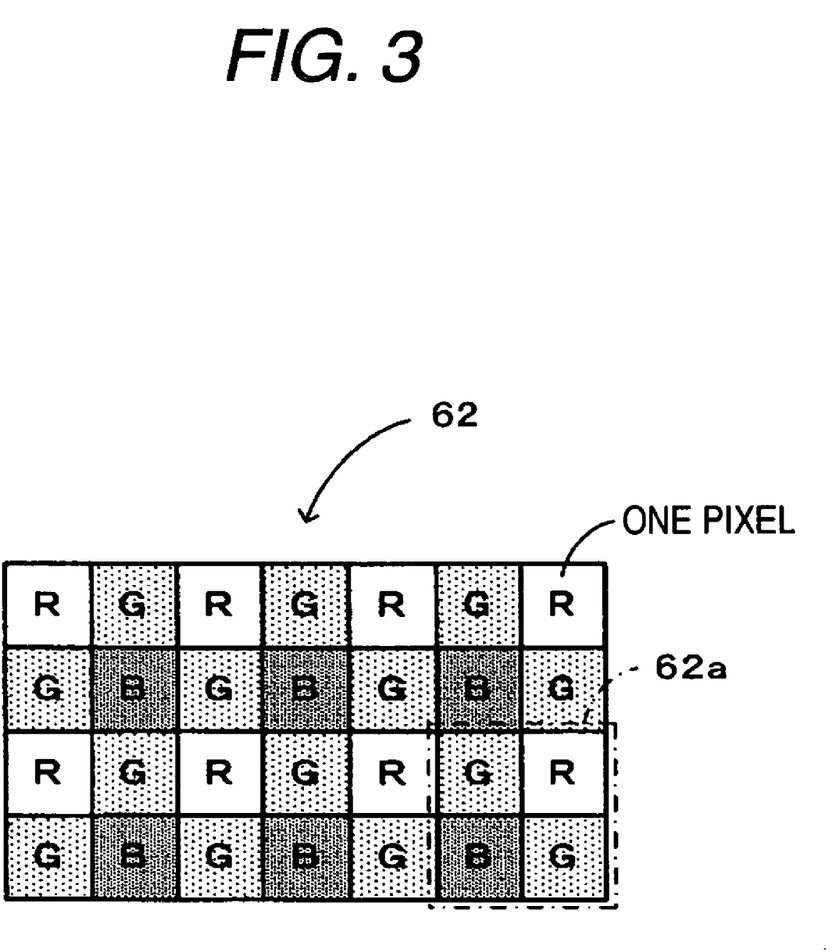
FIG. 3 is an explanatory diagram showing a color CCD.

The RAW file 50 will be described. The RAW file 50 is created in a digital camera 60 when the digital camera 60 performs photographing, and can be stored in the card type memory 30 inserted in the digital camera 60. The RAW file 50 includes a header 52 for storing various information, RAW data 54 to be unprocessed data in which an electric signal obtained from an electric charge generated by a light received by an image capturing unit (for example, a CCD or a CMOS) of the digital camera 60 is converted into digital data, and thumbnail data 56 to be a reduced image obtained by developing the RAW data 54. The header 52 is a region having information about the numbers of longitudinal and horizontal pixels of the RAW data 54 and a size of one pixel, for example. The RAW data 54 have data on one of R, G and B per pixel. The case in which the image capturing unit is a color CCD will be taken as an example. In a color CCD 62 to be used for the digital camera 60, generally, individual elements can identify separate colors from each other by covering a color filter for one of the three colors of R, G and B over the CCD. One R, one B and two Gs are disposed in a window 62a in two pixels by two pixels. For this reason, the RAW data 54 have the data on one of R, G and B for each pixel. The RAW data 54 usually have a high gradation representation of 8 to 16 bits for RGB and are subjected to a non-compression or a reversible compression in which the same state can be restored again even if a compression is performed. The thumbnail data 56 are obtained by developing the RAW data 54 to have a predetermined pixel size (for example, 160×120) in the digital camera 60. Therefore, color information about each pixel of the thumbnail data 56 depends on an image processing of the digital camera 60 performing photographing and an original region having an achromatic color is represented as the achromatic color.

Figure 4:
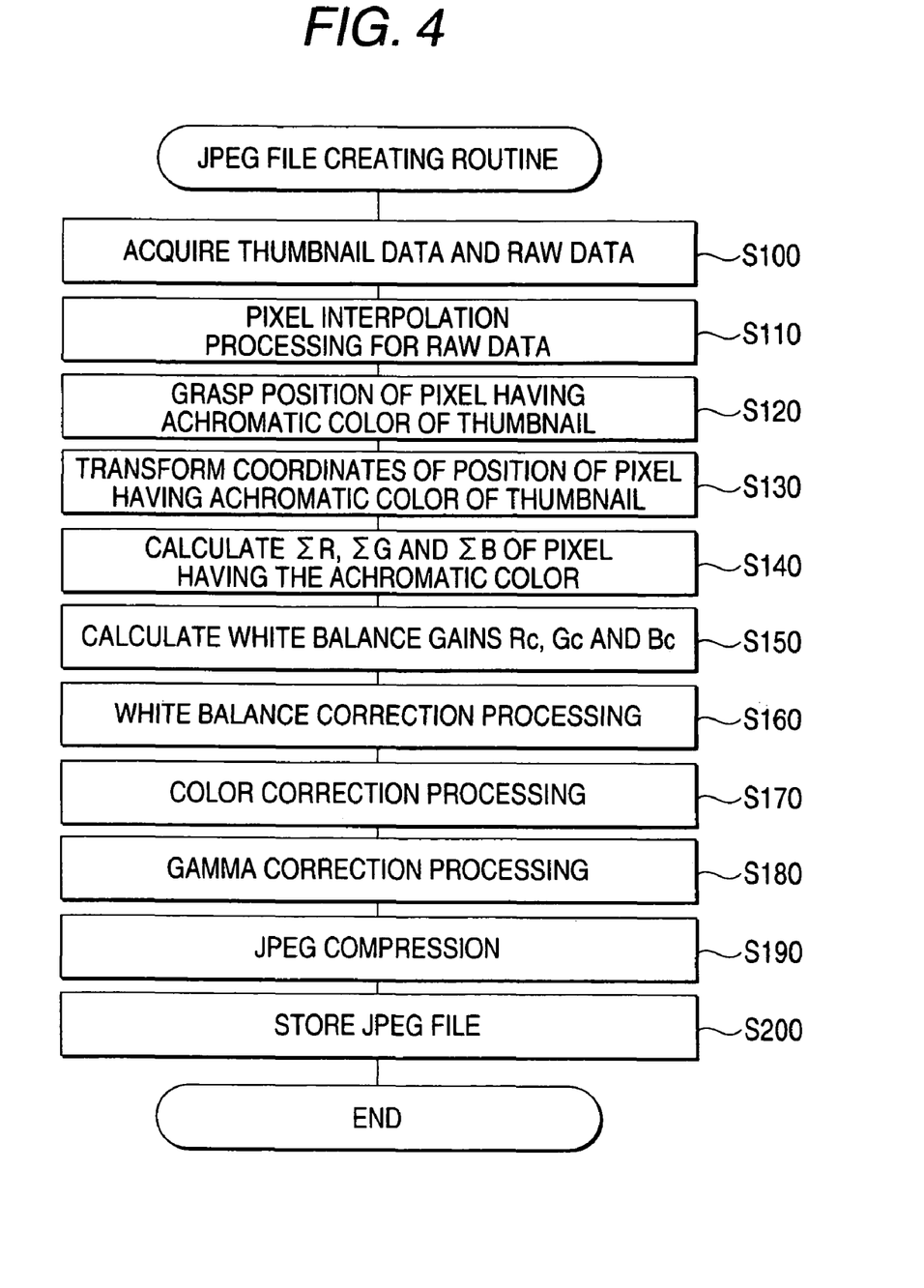
FIG. 4 is a flowchart showing a JPEG file creating routine.

Next, description will be given to an operation of the image processing apparatus 10 according to the embodiment which has such a structure, particularly, an operation to be performed in the execution of the JPEG file creating program. FIG. 4 is a flowchart showing a JPEG file creating routine to be executed by the CPU 12. The routine is stored in the program holder 28a of the HDD 28 and is executed when a user gives a command for executing the JPEG file creating program from the input device 27.

When the routine is started, the CPU 12 first acquires the thumbnail data 56 and the RAW data 54 from the RAW file 50 stored in the card type memory 30 (Step S100), and a pixel interpolation processing for the RAW data 54 is performed (Step S110). Data on each pixel which are included in the RAW data 54 are data on any one of R, G and B. Therefore, a guess is given from colors of surrounding pixels per pixel, thereby complementing for colors other than the same pixels. Since the processing of guessing a color is performed by connecting the same colors through a straight line or a curved line so as to be expressed, thus, it is referred to as a pixel interpolation processing.

Subsequently, the CPU 12 grasps a position of a pixel having an achromatic color of the thumbnail data 56 (Step S120). More specifically, an absolute value (|R−G|) of a difference between R and G in values of R, G and B included in each pixel of the thumbnail data 56 and an absolute value (|B−G|) of a difference between B and G are calculated, and it is decided whether both of the absolute values are included in a predetermined small range (which is smaller than three, for example). When they are included in the small range, the pixel is set to have an achromatic color and a position of the pixel having the achromatic color is stored in the RAM 16. It is assumed that each of the values of R, G and B included in each pixel of the thumbnail data 56 is expressed in 256 gradations (8 bits) of 0 to 255 corresponding to density. Moreover, it is apparent that the values of R, G and B are almost equal to each other in the pixel having the achromatic color. In the case in which the respective differences between the values of R, G and B are included in the predetermined small range as described above, accordingly, it is assumed to decide that the pixel has the achromatic color as described above. When the absolute values of the differences between two sets of the values of R, G and B are included in the predetermined small range, similarly, the absolute value of the difference between a residual set of the values is necessarily included in a certain range.

Figure 5:
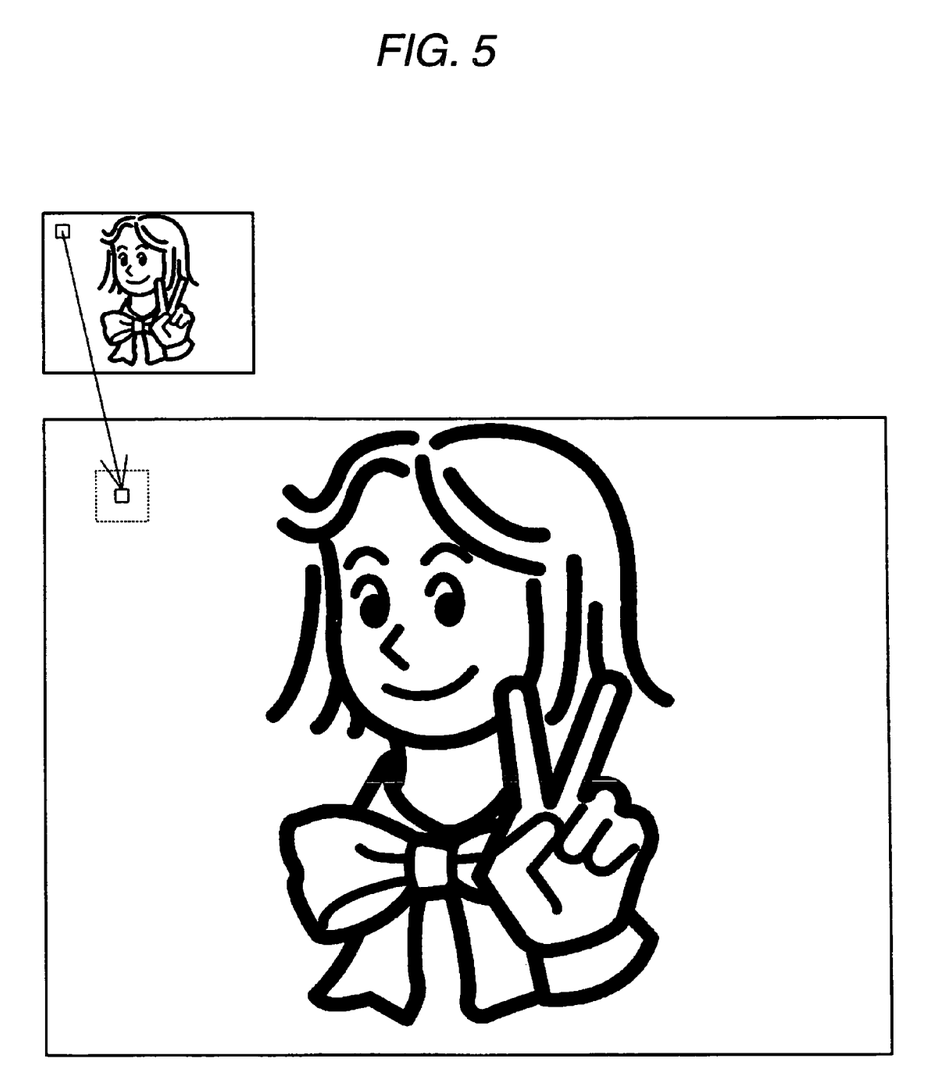
FIG. 5 is a view for explaining a coordinate transformation.
Figure 6:
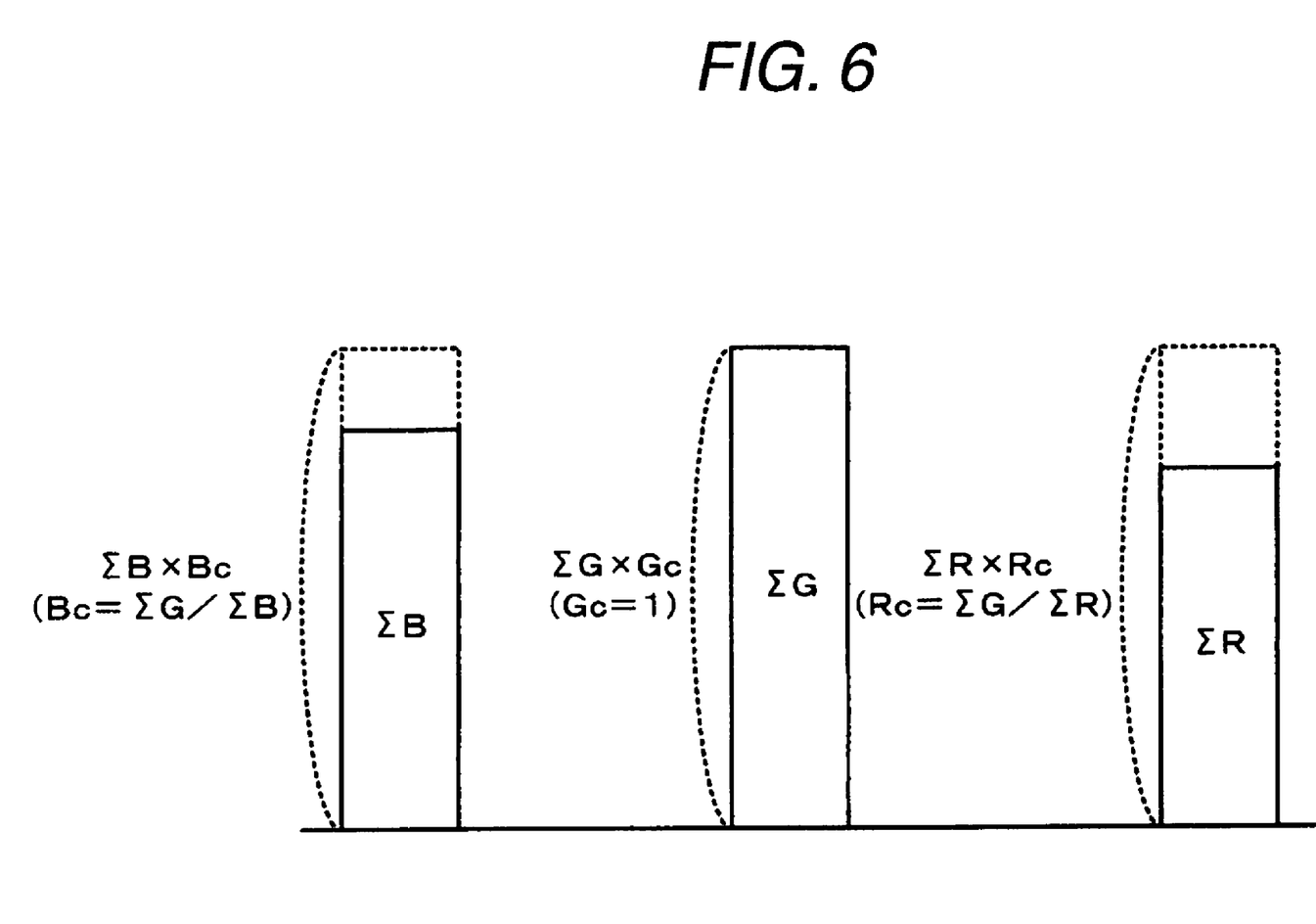
FIG. 6 is an explanatory diagram related to white balance correction gains Rc, Gc and Bc.

Subsequently, the CPU 12 corresponds to a position of the pixel having the achromatic color of the thumbnail data 56. A position of a pixel of the RAW data 54 is calculated by a coordinate transformation (Step S130). FIG. 5 is a view for explaining the coordinate transformation. Since the RAW data 54 are digital data, they cannot be recognized as an image by human eyes. In FIG. 5, however, the RAW data 54 are expressed in an image for convenience. An image of the thumbnail data 56 has a smaller size than the image of the RAW data 54. Therefore, there is a plurality of pixels of the RAW data 54 corresponding to the position of the pixel having the achromatic color of the thumbnail data 56. In the embodiment, however, it is assumed that a central one of the pixels corresponds to the position of the pixel having the achromatic color of the thumbnail data 56. Then, ΣR, ΣG and ΣB are calculated by integrating the values of R, the values of G and the values of B respectively per pixel having the achromatic color of the RAW data 54 which are obtained by the coordinate transformation (Step S140), and white balance gains Rc, Gc and Bc are calculated based on the values ΣR, ΣG and ΣB thus integrated (Step S150). FIG. 6 is an explanatory diagram related to the gains Rc, Gc and Bc. At the Step S150, the gain Gc is set to have a value of 1 (ΣG/ΣG), the gain Rc is set to be ΣG/ΣR and the gain Bc is set to be ΣG/ΣB in such a manner that the values of R and B are coincident with the value of G on the basis of the value of G as shown in FIG. 6. Then, the values of R, G and B of all the pixels of the RAW data 54 are multiplied by the gains Rc, Gc and Bc respectively, and the values obtained by the multiplication are set to be values of R, G and B obtained after the white balance correction processing (Step S160). Thereafter, there are performed a color correction processing of correcting a color corresponding to a human visual characteristic (Step S170) and a gamma correction processing of correcting a change in a brightness for an input signal to be linear (step S180). Thereafter, there is performed a JPEG compression for thinning color information with a low human sensitivity, dividing an image into small blocks and collecting colors, thereby reducing a file capacity (Step S190), and a file name is given to a JPEG file obtained after the JPEG compression and the JPEG file is then stored in a predetermined region of the HDD (Step S200), and the routine thus ends.

According to the image processing apparatus 10 in accordance with the embodiment described above in detail, the white balance correction for the RAW data 54 is performed by setting the thumbnail data 56 to be the developed data as an index. As compared with the case in which all of the RGB information about the respective pixels are read from the RAW data 54 to perform the white balance correction, consequently, the correction processing can be performed more rapidly. In particular, the pixel having the achromatic color can be easily extracted from the thumbnail data 56. By performing the white balance correction for the RAW data 54 with the position of the pixel having the achromatic color set to be the index, therefore, it is possible to rapidly perform the correction processing. At this time, the pixel having the difference between the values of R, G and B included in a predetermined small range is set to be the pixel having the achromatic color in the thumbnail data 56. Therefore, it is possible to specify the position of the pixel having the achromatic color of the thumbnail data 56 with high precision.

Second Embodiment

Figure 7:
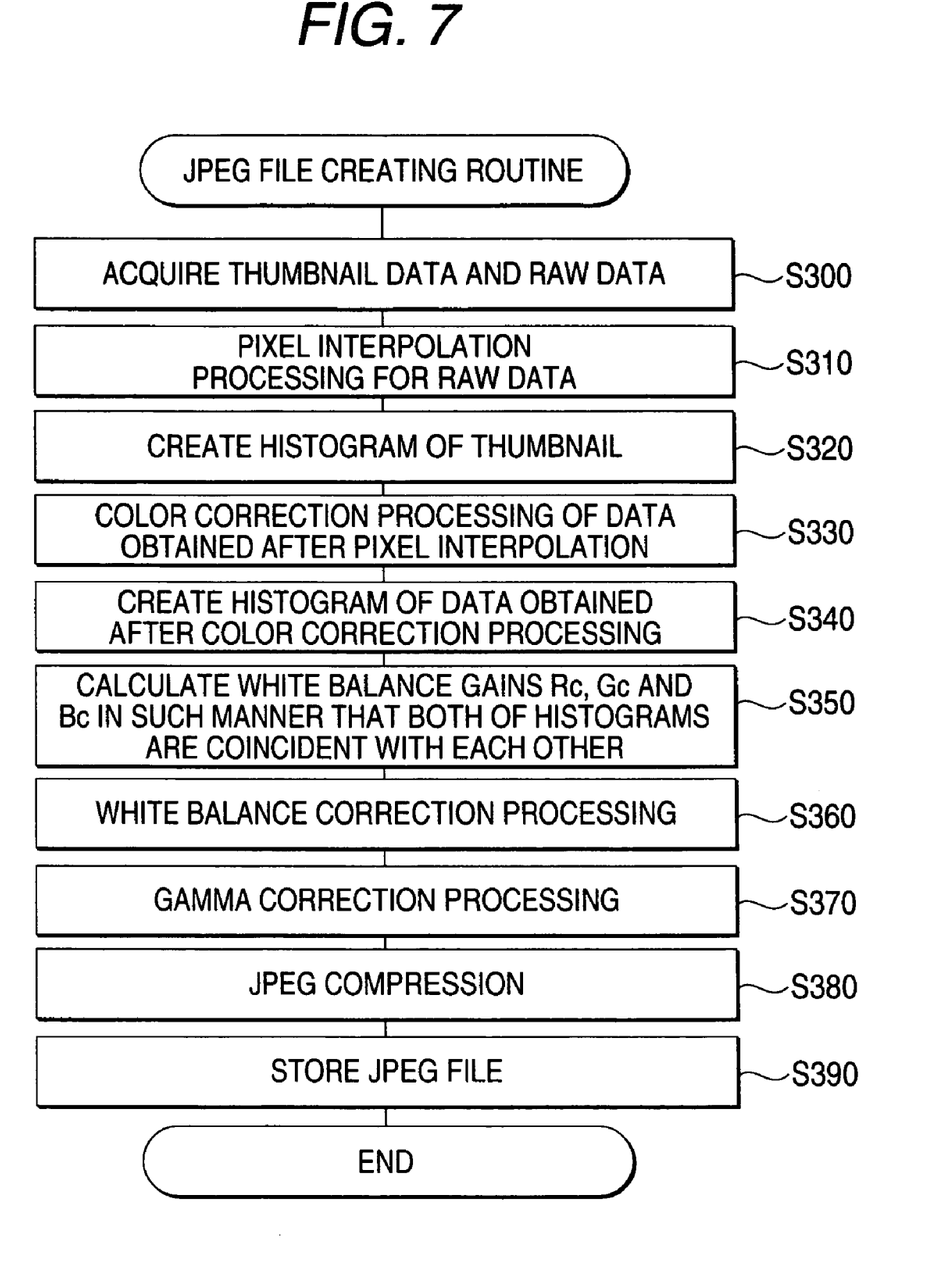
FIG. 7 is a flowchart showing the JPEG file creating routine.

Since a second embodiment is the same as the first embodiment except that a flowchart for a JPEG file creating routine is different, the same components have the same reference numerals and description thereof will be omitted. In the embodiment, a histogram representing a relationship between a gradation level and an appearance frequency (the number of pixels) in RAW data 54 and a histogram representing a relationship between a gradation level and an appearance frequency in thumbnail data 56 are created for each of R, G and B, and the former shape is corrected to be coincident with the latter shape and a white balance correction for the RAW data 54 is thus performed. FIG. 7 shows an example of the flowchart illustrating the JPEG file creating routine employing the correction.

Figure 8A:
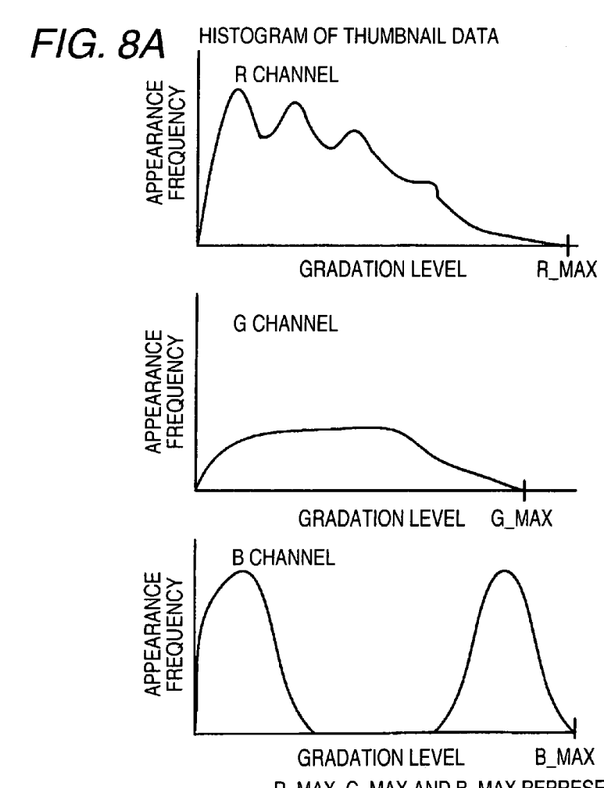
FIGS. 8A and 8B are a histogram of thumbnail data and RAW data.
Figure 8B:
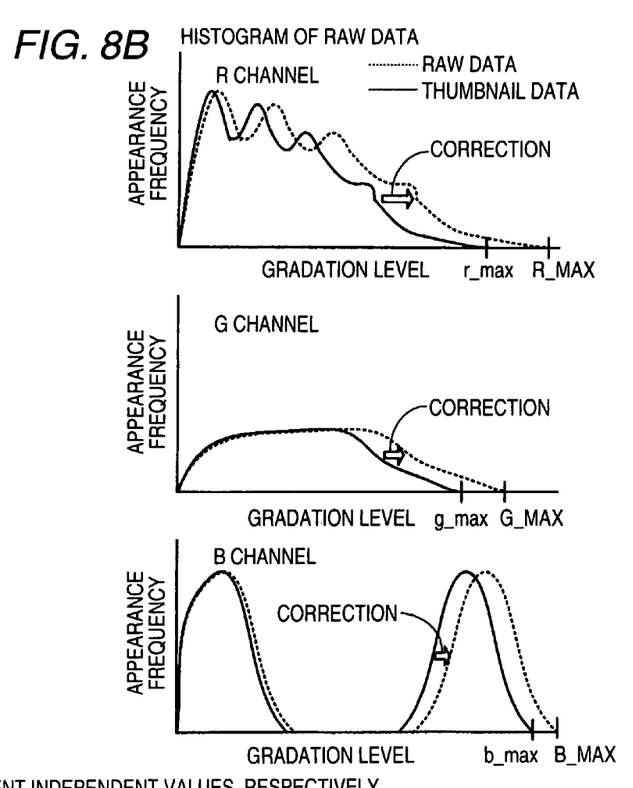

When the routine is started, a CPU 12 first acquires the thumbnail data 56 and the RAW data 54 from a RAW file 50 stored in a card type memory 30 (Step S300) and a pixel interpolation processing for the RAM data 54 is performed (Step S310). The pixel interpolation processing is the same as that in the Step S210. Subsequently, the CPU 12 creates a histogram for each of R, G and B of the thumbnail data 56 (Step S320) and the same color correction processing (Step S330) as that in the Step S170 is performed to the data obtained after the pixel interpolation processing for the RAW data 54, and a histogram for each channel of R, G and B of the data obtained after the color correction processing is then created (Step S340). As shown in FIGS. 8A and 8B, then, white balance gains Rc, Gc and Bc are calculated in such a manner that a shape of the histogram for each channel of R, G and B created at the Step S340 is coincident with that of the histogram for each channel of R, G and B of the thumbnail data 56 (Step S350). The shape of the histogram is corrected in such a manner that maximum gradation levels r_max, g_max and b_max of the histogram for each channel of R, G and B created at the Step S340 (the maximum value of gradation levels with an appearance frequency of 1 or more) is coincident with maximum gradation levels R_MAX, G_MAX and B_MAX of the histogram for each channel of R, G and B of the thumbnail data 56. In that case, the white balance gains Rc, Gc and Bc are calculated. Subsequently, each channel for R, G and B of all pixels of the RAW data 54 is multiplied by the gains Rc, Gc and Bc respectively and the values obtained by the multiplication are set to be values for R, G and B obtained after the white balance correction processing (Step S360). Then, the same gamma correction processing (Step S370) as the Step S180 and the same JPEG compression (Step S380) as the Step S190 are performed, a file name is given to a JPEG file obtained after the JPEG compression and the JPEG file is stored in a predetermined region of an HDD (Step S390), and the routine thus ends.

According to the embodiment described above in detail, the white balance correction for the RAW data 54 is performed by setting the thumbnail data 56 to be the developed data as an index. As compared with the case in which all of the RGB information about each pixel are read from the RAW data 54 to perform the white balance correction, consequently, the correction processing can be performed more rapidly. In particular, it can be supposed that the thumbnail data 56 are subjected to the white balance correction for the RAW data 54 by any processing method in a digital camera 60. By simply adapting the shape of the histogram of the data obtained after performing the pixel interpolation and color correction to the RAW data 54 to that of the histogram of the thumbnail data 56, therefore, it is assumed that the white balance correction for the thumbnail data 56 is applied to the RAW data 54. Consequently, it is possible to perform the white balance for the RAW data 54 rapidly.

It is apparent that the invention is not restricted to the embodiments but the invention can be executed in various modes without departing from the technical range thereof.

While the white balance correction is performed after the execution of the pixel interpolation processing for the RAW data 54 in the first and second embodiments, for example, it may be performed before the execution of the pixel interpolation processing.

Although the thumbnail data are utilized as the developed data in the first and second embodiments, it is possible to utilize, without a particular restriction, any data to be developed and stored simultaneously when storing the RAW data on an image photographed by the digital camera 60. For example, it is also possible to employ screen nail data as the developed data. Here, the screen nail data are, for example, embedded image data for displaying.

While it is not decided whether the pixel corresponding to the pixel having the achromatic color in the thumbnail data 56 of the RAW data 54 is actually the pixel having the achromatic color or not in the first embodiment, it may be decided whether the pixel corresponding to the pixel having the achromatic color in the thumbnail data 56 of the RAW data 54 is actually the pixel having the achromatic color or not and the white balance correction for the RAW data 54 may be performed based on the value of each channel of R, G and B of the pixel.

Although the absolute value (|R−G|) of the difference between R and G and the absolute value (|B−G|) of the difference between B and G in the values of R, G and B included in each pixel of the thumbnail data 56 are calculated and it is decided whether both of the absolute values are included in the predetermined small range (which is smaller than three, for example) or not in order to grasp the position of the pixel having the achromatic color of the thumbnail data 56 at the S120 in the first embodiment, a ratio (R/G) of R to G and a ratio (B/G) of B to G may be calculated to decide whether both of the ratios are included in a vicinal region of a value of "1" (for example, 0.99 to 1.01) or not, and the pixel may be decided to have the achromatic color if they are included in the same region.

While the RAW data 54 are corrected in such a manner that the maximum gradation levels r_max, g_max and b_max of the histogram of the data obtained by performing the pixel interpolation and color correction over the RAW data 54 are coincident with the maximum gradation levels R_MAX, G_MAX and B_MAX of the histogram in the thumbnail data 56 in the second embodiment, a mean value of the gradation level having an appearance frequency of 1 or more in the histogram may be used in place of the maximum gradation level or a value with which the appearance frequency of the histogram has a predetermined number (for example, 50% as a whole), that is, a median may be used. In any case, it is possible to rapidly perform the white balance correction for the RAW data 54.

In the second embodiment, it is also possible to compare a sum of the absolute values of the differences between both of the histograms (the differences in the appearance frequency for the respective gradation levels) obtained after the execution of the correction for causing the maximum gradation levels to be coincident with each other, a sum of the absolute values of the differences between both of the histograms obtained after the execution of the correction for causing the mean values to be coincident with each other and a sum of the absolute values of the differences between both of the histograms obtained after the execution of the correction for causing the medians to be coincident with each other, and to employ a correction processing in which the sum is a minimum as described above in order to correct the shape of the histogram of the data obtained after the execution of the pixel interpolation and color correction for the RAW data 54 to be coincident with that of the histogram of the thumbnail data 56. In the case in which the sum of the absolute values of the differences between both of the histograms obtained after the execution of each correction is the minimum, thus, it is possible to regard the shapes of both of the histograms to be the closest. Therefore, it is preferable to employ the correction processing.

The present disclosure relates to the subject matter contained in Japanese Patent Application No. 2005-313056 (filed on Oct. 27, 2005), which is expressly incorporated herein by reference in its entirely.

What is claimed is:

1. An image processing apparatus for performing a white balance correction for RAW data obtained by an image capturing unit, comprising:
   a storage, operable to store a RAW file to which the RAW data and developed data obtained by performing a development processing to the RAW data are attached; and
   a corrector, operable to perform the white balance correction for the RAW data based on the developed data stored in the storage,
   wherein the corrector performs a correction processing to a relationship between a gradation level and an appearance frequency in the RAW data in such a manner that a shape of a histogram representing the relationship between the gradation level and the appearance frequency in the RAW data is coincident with that of a histogram representing a relationship between a gradation level and an appearance frequency in the developed data, thereby performing the white balance correction for the RAW data for each color information.

2. The image processing apparatus according to claim 1, wherein the developed data is thumbnail data or screen nail data.

3. An image processing method of performing a white balance correction for RAW data obtained by an image capturing unit, comprising:
   performing the white balance correction for the RAW data based on developed data stored in a storage together with the RAW data and obtained by performing a development processing to the RAW data,
   wherein in the process of performing the white balance correction for the RAW data, a relationship between a gradation level and an appearance frequency in the RAW data is corrected in such a manner that a shape of a histogram representing the relationship between the gradation level and the appearance frequency in the RAW data is coincident with that of a histogram representing a relationship between a gradation level and an appearance frequency in the developed data, thereby performing the white balance correction for the RAW data for each color information in order to perform the white balance correction for the RAW data based on the developed data.

4. A non-transitory computer-readable storage medium with a program stored therein, wherein the program instructs a computer to execute the image processing method according to claim 3.

5. The image processing apparatus according to claim 1, wherein the corrector performs the correction processing in such a manner that a maximum value of the gradation level in which a pixel is present in the histogram in the RAW data is coincident with that of the gradation level in which a pixel is present in the histogram in the developed data for each color information.

6. The image processing apparatus according to claim 1, wherein the corrector performs the correction processing in such a manner that a mean value of the gradation level in which a pixel is present in the histogram in the RAW data is coincident with that of the gradation level in which a pixel is present in the histogram in the developed data for each color information.

7. The image processing apparatus according to claim 1, wherein the corrector performs the correction processing in such a manner that a gradation level obtained when an accumulation frequency of the histogram in the RAW data has a predetermined number is coincident with that obtained when an accumulation frequency of the histogram in the developed data has a predetermined number for each color information.

8. The image processing apparatus according to claim 1, wherein the corrector performs a plurality of iterations of the correction processing and selects an iteration in which a shape of the histogram of the RAW data most approximates that of the histogram of the developed data.

* * * * *